Dec. 22, 1959  L. PÉRAS  2,918,606
DEVICE FOR MEASURING RADIATIONS FROM A SPECTRUM
BY MEANS OF AN EXPLORING PHOTO-ELECTRIC CELL
Filed Sept. 26, 1957
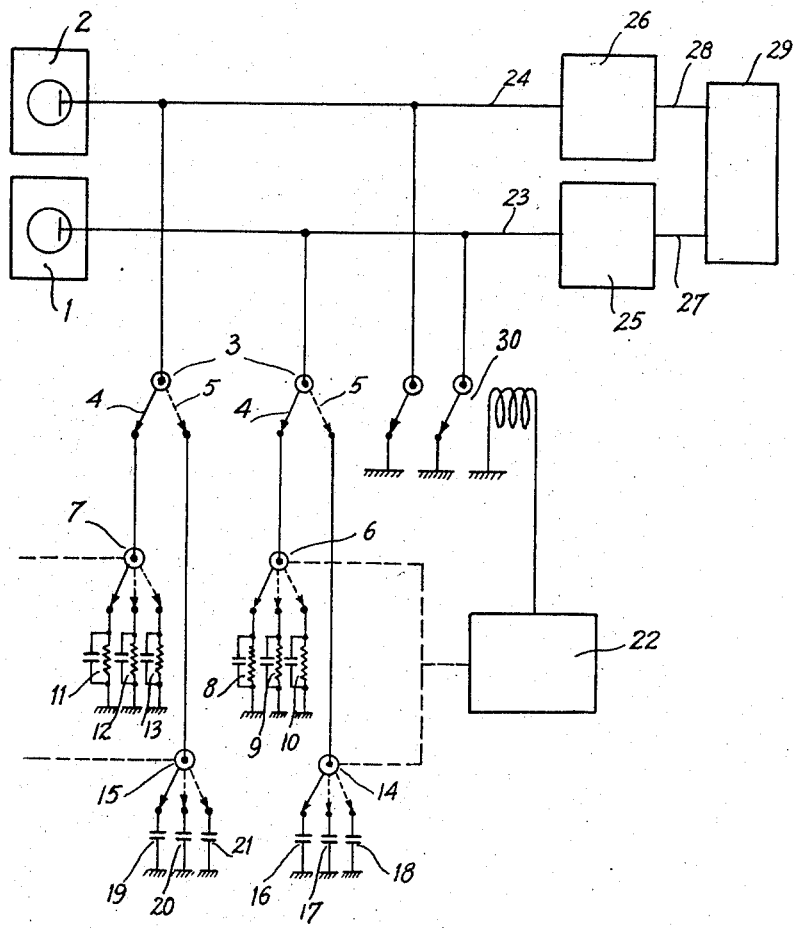
Inventor
Lucien Peras
by Stevens, Davis, Miller-Mosher
his attorneys

United States Patent Office 2,918,606
Patented Dec. 22, 1959

2,918,606

DEVICE FOR MEASURING RADIATIONS FROM A SPECTRUM BY MEANS OF AN EXPLORING PHOTOELECTRIC CELL

Lucien Péras, Billancourt, France, assignor to Regie Nationale des Usines Renault, Billancourt, France Application September 26, 1957, Serial No. 686,506

Claims priority, application France September 29, 1956

7 Claims. (Cl. 315—155)

Certain techniques for estimating the quantities of chemical elements in a material are based on the examination of the spectrum of electro-magnetic emission of the material subject to thermal or electric excitation.

These techniques employ an excitation device for producing the conditions required for the emission of a radiation; a dispersion device for decomposing this radiation into a spectrum; and a receiving device in which the examination of this spectrum is effected.

From the time of their first use, the spectrum techniques have employed a photographic emulsion as the receiving device. However, still more recent developments of the so-called direct-reading type, utilise a group of receiving units, each of which comprises essentially a slot intended to isolate one radiation in the spectrum, and a photo-electric cell intended to convert the energy of this radiation to electrical energy.

In a very general way, the technique of direct reading is directed to the measurement of the ratio of the intensity of one characteristic radiation of the spectrum of the chemical element to be estimated, to the intensity of a reference radiation. This reference radiation may be derived from the overall radiation, or it may be a radiation of the spectrum, characteristic or basic element of the main constituent of the material.

Such measurements are in general necessary during the course of a single period of excitation, for different radiaions which are characteristic of different chemical elements. A known solution of this problem consists in providing two receiving units, one of which $t$ is fixed and receives the reference radiation, the other $x$ exploring the spectrum and receiving successively the characteristic radiations of the chemical elements to be quantitatively estimated.

These techniques require the use of a measuring device which is adapted to supply the ratio of the photoelectric current at the output of the exploring cell $x$, or signal numerator X, to the photo-electric current produced by the fixed cell $t$ or signal denominator T.

A measuring unit is known which is suitable for the particular case in which the radiation analysed is modulated at a pre-determined frequency as a result of the characteristics of the excitation device. This unit comprises two conversion channels of identically the same construction, the inputs of which are connected to the receiver units $x$ and $t$, while the outputs are connected to a recording potentiometer which carries out the function of a quotient-meter. Each conversion channel ensures the adaptation of impedance, the amplification, the filtering and the detection of the signal. It comprises:

(a) A suitable input impedance, constituted by a resistance-capacity time-constant, through which passes the photo-electric current of the receiving unit, from which results a signal modulated at the same frequency as the radiation analysed.

(b) An alternating potential amplifier, which amplifies the non-continuous component of the signal and causes an amplified signal to appear at low impedance.

(c) A band-pass filter which selects from the amplified signal the component which is modulated at the same frequency as the analysed radiation, and eliminates the parasitic or stray frequencies.

(d) A rectifier which converts this component to a uni-directional voltage.

This unit, which comprises two filters and two rectifiers in addition to the two amplifiers, is of fairly complicated construction. Due to the use of rectifiers, the response is no longer linear if one of the signals is too weak. Because of the use of alternating-potential amplification, the input impedances cannot be pure capacities, and the integration of the signals is impracticable. Finally, the main drawback of this arrangement resides in the fact that its design assumes that there is modulation of the radiation, and therefore pre-supposes the use of an excitation device producing periodic discharges at a determined frequency. In consequence, this excludes: the use of a non-periodic mode of excitation such as a continuous arc or alternatively the non-controlled arc or spark; the use of different excitation devices which can be substituted one for the other if the discharge frequencies are different; the use of an excitation device in which the discharges are produced at very low frequency (of the order of one cycle per second); the use of an excitation device in which the discharges are produced at a frequency which can be varied at will.

The present invention relates to a measuring unit which overcomes these drawbacks and permits of the use of non-periodic forms of excitation, either at low frequency or at a variable frequency.

During the last few years, continuous-voltage-amplifiers have been constructed which give complete satisfaction, being robust and free from zero errors. The device forming the object of the present invention comprises the application of such amplifiers to the measurement of radiations of a spectrum from an exploring photo-electric cell.

In accordance with the invention, the anode circuits of two photo-electric cells, of which one receives the analysing radiation and the other the reference radiation, are connected to time-constants or to capacities, and these circuits are coupled to the input terminals of continuous-voltage-amplifiers, the output terminals of which are connected to a recording potentiometer which functions as a quotient-meter.

There is thus obtained in a simple manner a measurement of the ratio of the intensities of the radiations received by the photo-electric cells, and this either by integrating measurement if capacities are used, or by progressive measurement if time-constants are employed.

There has been shown by way of example and in diagrammatic form in the accompanying drawings, one form of embodiment of a device in accordance with the invention.

The measuring unit shown diagrammatically in Fig. 1 comprises two circuits: an analysing circuit associated with the receiving unit 1 of the radiation of analysis, and a reference circuit associated with the receiver unit 2 of the reference radiation. The units 1 and 2 are photoelectric cells of conventional type in spectrographic apparatus of the direct-reading type, for example, photomultiplier tubes. A change-over switch 3 with two positions 4 and 5 enables the anode circuits of the receiver units 1 and 2 to be connected at will to one side of the time-constants or to the capacities, the other side being connected to earth. In the position 4 of the switch 3, corresponding to the use of a time-constant, the device gives a measurement of the ratio of the instantaneous intensities of the two radiations, or progressive measurement; two change-over switches 6 and 7 enabling the impedances 8, 9 and 10 for the measurement circuit 11, 12 or 13 for the reference circuit to be selected. In the position 5 of the switch 3, corresponding to the use of a capacity, the device provides a measurement of the ratio of the integrated intensities of the two radiations, or integrating measurement; two change-over switches 14 and 15 permit of the choice of the impedances 16, 17 or 18 for the measuring circuit 19, 20 or 21 for the reference circuit. The switches 6, 7, 14 and 15 are employed to fix the sensitivity of the two circuits. The switches 7 and 15 associated with the reference circuit are operated manually. The switches 6 and 14 associated with the measuring circuit are controlled automatically by the exploring mechanism of the spectrum 22, in order to fix the necessary sensitivities for the various radiations explored. The spectrum 22 is a spectrum exploration mechanism. This device comprises, for example (according to French Patents 1,018,600 and 1,018,-601 of the Radio Cinema Company) a change-speed gear box driven by a silent triphase motor and connected to the exploration cell by a double Cardan joint.

The change-speed gear box consists of a planetary gear train for changing from one speed to the other. It operates automatically through the means of electromagnets which assure successively the immobilization of the different elements of the planetary gear train. The box permits four movements: stopping, rapid forward speed, slow forward speed and backing.

The device further comprises a timing system which determines the time during which the exploration cell remains immobile in front of each of the rays corresponding to the elements to be measured and also comprises control relays for the electromagnets and a source for feeding the relays.

This mechanism assures the movement of the exploration cell, the control of relays 30 and the control of the switches 6 or 14.

The exploration cell is displaced along the focal plane of the spectrograph. An electronic feeler controls the electromechanical stopping device, which feels the stops of an instrument for the analysis of Invar steel.

For each selected ray, i.e. for each selected position, the swinging of a sector in a recess of adequate contour causes a shaft to rotate for a distance sufficient to permit the automatic selection of the position of the switches 6 or 14 that fix the sensitivity of the circuits.

The receiver units 1 and 2 are respectively connected to the inputs 23 and 24 of two continuous-voltage amplifiers 25 and 26. These amplifiers are identical in principle and may have a gain greater than unity; they then have a true amplifying function. But their gain may be equal to or even less than unity. Their essential function consists in acting as impedance-adapting devices, that is to say in passing the two signals at low impedance. The amplifiers 25 and 26 are direct voltage amplifiers of very high input impedance, having no zero offset, and are constructed, for example, in accordance with French Patent 1,082,726 to Lemouzy. The outputs 27 and 28 of the two amplifiers are connected to a recording potentiometer 29 which performs the function of a quotient-meter. The potentiometer 29 is a recording potentiometer, for example, of the "Brown Honeywell" type, which carries out the function of a conventional quotient-meter.

A relay 30 controlled by the spectrum-exploring mechanism 22 ensures the connection to earth of the inputs of the amplifiers 23 and 24, except during the measurement periods. Thus, in the case of integration measurements, the capacities, for example 16 and 19, are discharged at the end of each elementary measurement.

By way of example of use, the following orders of quantities may be given: Photo-electric currents at the outputs of 1 and 2, of the order of 1 microampere.

The time-constants 8, 9, 10, 12 and 13: resistance of the order of 1 megohm, capacity of the order of 0.1 microfarad.

Condensers 16, 17, 18, 19, 20 and 21: capacity of the order of 10 microfarads.

Signals at 23 and 24: potential of the order of 1 volt.

Gain of the amplifiers 25 and 26: may be equal to unity.

The device described above is of very simple construction. Its response is linear. It enables not only progressive measurements, but also integrating measurements to be effected. It can be used whatever may be the nature of the conditions of excitation of the material, whether it is a question of a continuous arc or of repeated discharges, and whether in the latter case, the discharges are produced irregularly in respect of time or whether they are produced periodically, and whatever their frequency may then be.

I claim:

1. A device for the direct analysis of the radiation spectra of materials, produced by thermal or electric excitation of said materials, said device being particularly adapted to the rapid quantitative estimation of a number of chemical elements of said materials during a single period of excitation, and comprising: a fixed photo-electric cell intended to receive a reference radiation; an exploring photo-electric cell intended to receive successively different radiations to be analysed; a recording device functioning as a quotient-meter; two conversion channels, each of which couples the output of one of said photo-electric cells of the input of said recording device; a continuous-voltage amplifier provided in each said channel and acting as an impedance-adapting device; a plurality of impedances each including at least a capacity; and means for selectively coupling said impedances to the output circuit of each said photo-electric cell.

2. A device for the direct analysis of the radiation spectra of materials, produced by thermal or electric excitation of said materials, said device being particularly adapted to the rapid quantitative estimation of a number of chemical elements of said materials during a single period of excitation, and comprising: a fixed photo-electric cell intended to receive a reference radiation; an exploring photo-electric cell intended to receive successively different radiations to be analysed; a recording device functioning as a quotient-meter; two conversion channels, each of which couples the output of one of said photo-electric cells to the input of said recording device; a continuous-voltage amplifier provided in each said channel and acting as an impedance-adapting device; a plurality of impedances; and means for selectively coupling said impedances to the output circuit of each photo-electric cell, said selective coupling means including two change-over switches, each switch being adapted to connect either of two groups of different impedances to the output circuit of one of said photo-electric cells.

3. A device as claimed in claim 2, in which one of said groups of different impedances comprises a plurality of time-constant combinations, provided in order to obtain progressive measurements.

4. A device as claimed in claim 2, in which one of said groups of different impedances comprises a plurality of pure capacities, provided in order to obtain integrating measurements.

5. A device for the direct analysis of the radiation spectra of materials, produced by thermal or electric excitation of said materials, said device being particularly adapted to the rapid quantitative estimation of a number of chemical elements of said materials during a single period of excitation, and comprising: a fixed photo-electric cell intended to receive a reference radiation; an exploring photo-electric cell intended to receive successively different radiations to be analysed; a recording device functioning as a quotient-meter; two conversion channels, each of which couples the output of one of said photo-electric cells to the input of said recording device; a continuous-voltage amplifier provided in each said channel and acting as an impedance-adapting device; a plurality of impedances; and means for selectively coupling said impedances to the output circuit of each photo-electric cell, said selective coupling means comprising two change-over switches, each switch being adapted to connect either of two groups of different impedances to the output circuit of one of said photo-electric cells, one of said impedance groups being formed by a plurality of resistance-capacity combinations, the other said impedance group consisting of a plurality of capacitors; and further comprising a selector switch associated with each said group, enabling the value of the resistance of the resistance-capacity combinations, or the capacity of the said capacitors to be varied at will, in order to fix the sensitivity of each said channel.

6. A device as claimed in claim 5, and further comprising a spectrum-exploring mechanism, the said selector switches associated with the output of the exploring photo-electric cell being adapted for automatic operation by said exploring mechanism, in order to fix the sensitivities required for the different radiations explored.

7. A device as claimed in claim 5, and further comprising a spectrum-exploring mechanism and a relay device actuated by the said exploring mechanism in such manner that the input circuits of said amplifiers are automatically connected to earth during periods of non-measurement.

References Cited in the file of this patent

UNITED STATES PATENTS

| | | |
|---|---|---|
| 2,562,968 | Teichmann et al. | Aug. 7, 1951 |
| 2,803,752 | Warren | Aug. 20, 1957 |
| 2,833,931 | Constable | May 6, 1958 |

OTHER REFERENCES

"Sorting Eggs by Shell Color," article in page 198 of "Electronics" of April 1953.